(12) United States Patent
Diu (10) Patent No.: US 12,425,401 B2
(45) Date of Patent: Sep. 23, 2025

(54) ACCESSING RESOURCES THROUGH A PROXY MODULE AND EDGE SYSTEM

(71) Applicant: INTERNATIONAL BUSINESS MACHINES CORPORATION, Armonk, NY (US)

(72) Inventor: Wayne Diu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 18/342,568

(22) Filed: Jun. 27, 2023

(65) Prior Publication Data

US 2025/0007908 A1 Jan. 2, 2025

(51) Int. Cl.
G06F 7/04 (2006.01)
H04L 9/40 (2022.01)

(52) U.S. Cl.
CPC ...... H04L 63/0876 (2013.01); H04L 63/0281 (2013.01); H04L 63/10 (2013.01)

(58) Field of Classification Search
CPC . H04L 63/0876; H04L 63/0281; H04L 63/10; H04L 63/0884; G06F 21/31; G06F 21/335
See application file for complete search history.

(56) References Cited

U.S. PATENT DOCUMENTS 7,136,635 B1 * 11/2006 Bharatia .............. H04L 65/80 370/912
9,465,668 B1 * 10/2016 Roskind .............. H04L 67/34
11,080,065 B1 * 8/2021 Reshadi .............. H04L 67/564
11,606,359 B1 3/2023 Virtser et al.
(Continued)

FOREIGN PATENT DOCUMENTS

CN 110611724 A 12/2019

OTHER PUBLICATIONS

Ohba et al, An Authentication Client Proxy Mechanism for Resource-Constrained Devices, May 19, 2012, IEEE, pp. 1-8. (Year: 2012).*

(Continued)

Primary Examiner — Philip J Chea
Assistant Examiner — Jenise E Jackson
(74) Attorney, Agent, or Firm — Konrad, Raynes, Davda & Victor LLP; David Victor (57) ABSTRACT

Provided are a computer program product, system, and method for accessing resources through a proxy module and edge system. A proxy module receives a configuration request initiated by a user to access the resource at the resource server. The proxy module sends, to a gateway proxy module on an edge system, configuration data to communicate with the resource server and authentication information to authenticate with the resource server to access the resource. The gateway proxy module uses the configuration data to communicate with the resource server and send the authentication information to the resource server to authenticate with the resource server. The proxy module receives, from the gateway proxy module, results of the gateway proxy module authentication with the resource server. Indication that that the configuration request succeeded is returned to the user that initiated the configuration request.

20 Claims, 5 Drawing Sheets

(56) References Cited

U.S. PATENT DOCUMENTS

| | | | |
|---|---|---|---|
| 2004/0268145 A1* | 12/2004 | Watkins | H04L 63/1433 714/E11.207 |
| 2006/0271695 A1* | 11/2006 | Lavian | G06F 21/552 709/229 |
| 2018/0351733 A1* | 12/2018 | Rohel | H04L 63/062 |
| 2019/0306267 A1 | 10/2019 | Lee et al. | |
| 2020/0099675 A1 | 3/2020 | Mardiks Rappaport et al. | |

OTHER PUBLICATIONS

Meddahi et al, Enabling Secure Third Party Control on Wireless Home Networks, Aug. 11, 2004, IEEE, pp. 46-54. (Year: 2004).*

"Edge device," Wikipedia, 1 pp. [online][retrieved Jun. 19, 2023] https://en.wikipedia.org/wiki/Edge_device.

"Load Balancing Apache Tomcat Servers with NGINX Open Source and NGINX Plus, " NGINX, 16 pp., [online] [retrieved Jun. 26, 2023] https://docs.nginx.com/nginx/deployment-guides/load-balance-third-party/apache-tomcat/.

"Reverse proxy," Wikipedia, 2 pp. [online][retrieved Jun. 19, 2023] https://en.wikipedia.org/wiki/Reverse_.

"Advanced Load Balancer, Web Server, & Reverse Proxy," NGINX, 8 pp., [online][retrieved Jun. 26, 2023] https://www.nginx.com/.

"Load Balancing Node.js Application Servers with NGINX Open Source and NGINX Plus", NGINX, 15 pp., [online] [retrieved Jun. 26, 2023] https://docs.nginx.com/nginx/deployment-guides/load-balance-third-party/node-js.

"NGINX Reverse proxy," NGINX, 3 pp., [online][retrieved Jun. 26, 2023] https://docs.nginx.com/admin-guide/web-server/reverse-proxy/.

"WebSocket proxying", NGINX, 2 pp., [online][retrieved Jun. 26, 2023] https://nginx.org/en/docs/http/websocket.html?_ga=2.84403353. 146477 . . .

"NGINX as a WebSocket Proxy", 14 pp.[online] retrieved Jun. 27, 2023], May 16, 2014, https://www.nginx.com/blog/websocket-nginx/.

* cited by examiner

ACCESSING RESOURCES THROUGH A PROXY MODULE AND EDGE SYSTEM

1. FIELD OF THE INVENTION

The present invention relates to a computer program product, system, and method for accessing resources through a proxy module and edge system.

2. BACKGROUND

A reverse proxy is an application that manages web access requests sent over the Internet to a web server to manage the requests to the web server. The reverse proxy server inspects the request, determines whether the request is valid, and, if validated, forwards the request to an internal application or web server. The web server processes the request and returns the requested resource to the reverse proxy server to transmit back to the client.

SUMMARY

Provided are a computer program product, system, and method for accessing resources through a proxy module and edge system. A proxy module receives a configuration request initiated by a user to access the resource at the resource server. The proxy module sends, to a gateway proxy module on an edge system, configuration data to communicate with the resource server and authentication information to authenticate with the resource server to access the resource. The gateway proxy module uses the configuration data to communicate with the resource server and to send the authentication information to the resource server to authenticate with the resource server. The proxy module receives, from the gateway proxy module, results of the gateway proxy module authentication with the resource server. Indication that that the configuration request succeeded is returned to the user that initiated the configuration request in response to the gateway proxy module authenticating with the resource server to access the resource.

DETAILED DESCRIPTION

The description herein provides examples of embodiments of the invention, and variations and substitutions may be made in other embodiments. Several examples will now be provided to further clarify various embodiments of the present disclosure:

Example 1: A computer implemented method for communicating with a resource server to access a resource. The method comprises receiving, by a proxy module, a configuration request initiated by a user to access the resource at the resource server. The method further comprises sending, by the proxy module, to a gateway proxy module on an edge system, configuration data to communicate with the resource server and authentication information to authenticate with the resource server to access the resource. The method further comprises using, by the gateway proxy module, the configuration data to communicate with the resource server and to send the authentication information to the resource server to authenticate with the resource server. The method further comprises receiving, by the proxy module, from the gateway proxy module, results of the gateway proxy module authentication with the resource server. The method further comprises returning, to the user that initiated the configuration request, that the configuration request succeeded in response to the gateway proxy module authenticating with the resource server to access the resource. Thus, embodiments advantageously reduce processing burdens on users who access resources from different resource services requiring different authentication information, such as session tokens, by allowing users to submit requests for resources, which may require different session tokens and authentication information to access, without having to present authentication information, such as session tokens, to access, and having the proxy module and the gateway proxy module manage the session tokens and authentication information needed to access the requested resources. Further, embodiments advantageously improve security in reducing the distribution of authentication information by consolidating the management and presentation of authentication information, that would otherwise be distributed to users, in the proxy module and gateway proxy module to minimize the distribution of session tokens and minimize points of attack to steal authentication information.

Example 2: The limitations of any of Examples 1 and 3-10, where the method further comprises detecting, by the gateway proxy module, an interruption in communication with the proxy module. The method further comprises, in response to detecting the interruption, clearing a local cache, of the gateway proxy module, storing configuration data and authentication information for a proxied resource managed by the gateway proxy module and requesting, by the gateway proxy module, configuration data and authentication information for the proxied resource managed by the gateway proxy module. Thus, embodiments advantageously ensure the gateway proxy module includes current configuration data and authentication information by having the gateway proxy module refresh the configuration data and authentication information when the connection to the proxy module is interrupted, and the accuracy of the information the gateway proxy module maintains may be called into question.

Example 3: The limitations of any of Examples 1, 2 and 4-10, where the method further comprises in response to failing, by the proxy module, to send, to the gateway proxy module, the configuration data and the authentication information, resending, to the gateway proxy module, the configuration data and the authentication information prior to a next proxy request for the resource. Thus, embodiments advantageously offload operations to the gateway proxy module, and reduce processing burdens on the proxy module, by having the proxy module ensure that the gateway proxy module includes the configuration data and authentication information needed to access a resource before a user requests access to the resource in order to reduce latency in responding to user requests for the proxied resource.

Example 4: The limitations of any of Examples 1-3 and 5-10, where the method further comprises in response to receiving the configuration request, further performing discovering the edge system to interface with the resource server, installing, by the proxy module, the gateway proxy module on the discovered edge system; and receiving, by the proxy module, a request to establish a connection with the gateway proxy module in response to the installing of the gateway proxy module on the edge system. The proxy module sends the configuration data and the authentication information to the gateway proxy module in response to establishing the connection with the gateway proxy module. Thus embodiments advantageously have the proxy module manage the edge systems by discovering the edge systems and installing the gateway proxy modules on the discovered edge systems to consolidate management of the edge systems in the proxy module to simplify the process for users to access proxy resources.

Example 5: The limitations of any of Examples 1-4 and 6-10, where the method further comprises retrieving, by the proxy module, the authentication information for an existing session with the resource server from a database, where the retrieved authentication information is sent to the gateway proxy module with a request to use the retrieved authentication information to authenticate with the resource server. Thus, embodiments advantageously improve security of the authentication information by having the proxy module manage the authentication information for multiple gateway modules and authenticate gateway proxy modules and distribute the authentication information.

Example 6: The limitations of any of Examples 1-5 and 7-10, where the method further comprises receiving, by the proxy module, from a user system, a request to access the resource at the resource server. The method further comprises calling an authentication module to authenticate the user system to access the resource at the resource server. The method further comprises in response to authenticating the request from the user system for the resource, requesting the gateway proxy module to proxy into the resource server to access the resource. The method further comprises receiving, by the proxy module, the resource from the gateway proxy module. The method further comprises returning, by the proxy module, the resource to the user system initiating the request. Thus, embodiments advantageously reduce processing burdens on the proxy module by offloading the operations to proxy into the resource server to access the resource and return the resource to a gateway proxy module in an edge gateway system separate from the proxy module.

Example 7: The limitations of any of Examples 1-6 and 8-10, where the method further comprises the user system submits multiple requests to the proxy module for the resource without passing authentication information related to the resource server. Thus, embodiments advantageously reduce processing burdens on the users by having the proxy module and gateway proxy module manage and submit the session tokens and authentication information to the resource manager to access a requested resource. Further, processing burdens on users are further reduced when accessing resources in different resources servers requiring different session tokens and authentication information because the proxy module and gateway proxy modules handle managing and submitting the session tokens and authentication information to the resources servers. In this way, the user need only submit the request for the resource without the session tokens or authentication information, thereby reducing burdens on the user.

Example 8: The limitations of any of Examples 1-7 and 9-10, where the method further comprises receiving, by the proxy module, a request for configuration data or the authentication information to proxy into the resource server in response to the gateway proxy module not having the configuration data or the authentication information to access the resource at the resource server. The method further comprises retrieving, by the proxy module, the configuration data to access the resource server and authentication information for the resource at the resource server in a database. The method further comprises returning, by the proxy module, the retrieved configurating data and the authentication information to the gateway proxy module to use to access the resource at the resource server. Thus, embodiments advantageously reduce communication traffic and conserves bandwidth between the proxy module and the gateway proxy module in the edge system by having the gateway proxy module only request configuration data or authentication information when needed to proxy into the resource server when the gateway proxy module does not have the configuration data and authentication information that is needed.

Example 9: The limitations of any of Examples 1-8 and 10, where the method further comprises determining, by the proxy module, whether the authentication information can be retrieved from the database. The method further comprises sending, by the proxy module, to the gateway proxy module, a request to acquire authentication information from the resource server to access the resource. The method further comprises receiving, by the proxy module, from the gateway proxy module, the authentication information in response to the request to acquire the authentication information. The method further comprises updating, by the proxy module, the database with the authentication information obtained in response to the request to acquire the authentication information. Thus, embodiments advantageously reduce processing burdens on the proxy module, which may be managing numerous gateway proxy modules, by having the proxy module offload the processing burdens to acquire authentication information from the resource server to the gateway proxy module to provide up-to-date authentication information for the proxied resource.

Example 10: The limitations of any of Examples 1-9, where the method further comprises receiving, by the proxy module, a request, from a program module executing within the primary server, to access the resource at the resource server. The method further comprises calling, by the proxy module, an authentication module to authenticate the program module to access the resource at the resource server. The method further comprises, in response to authenticating the program module and the request for the resource, requesting the gateway proxy module to proxy into the resource server to access the resource. The method further comprises receiving, by the proxy module, the resource from the gateway proxy module. The method further comprises returning, by the proxy module, the resource to the program module initiating the request. Thus, embodiments advantageously reduce processing burdens on the proxy module by offloading the operations to proxy into the resource server to access the resource and return the resource to a gateway proxy module in an edge gateway system separate from the proxy module.

Example 11 is an apparatus comprising means to perform a method as claimed in any preceding claim.

Example 12 is a machine-readable storage including machine-readable instructions, when executed, to implement a method or realize an apparatus as claimed in any preceding claim.

Additionally or alternatively, an embodiment in which the element of Example 1 of the authentication information to authenticate with the resource server to access the resource, which is sent to the gateway proxy module, comprises a session token or other ephemeral types of authentication information the proxy module maintains in a temporary database and that is derived from authentication information, has the technical effect of reducing processing burdens on the proxy module by having the gateway proxy module in the edge server system manage the session token or other ephemeral types of authentication information to submit to the resource server to access the resource.

In accessing resources on servers throughout the Internet that are accessed through a reverse proxy server, the user systems typically manage credentials and session tokens to access the secured resources through the reverse proxy server.

Described embodiments provide improvements to computer technology for accessing a proxied resource at a remote resource server by allowing the user system to submit requests for proxied resources without having to provide session tokens or other authentication information for the resource. Described embodiments utilize a proxy module in a cloud service the user system accesses and a gateway proxy module in an edge system that has network access to a resource server managing the proxied resource. The gateway proxy module manages the authentication and access to the proxied resource. The proxy module requests the gateway proxy module in the edge system to initiate an authenticated session with the resource server for the proxied resource and access the proxied resource to return to the proxy module. In this way, the user system initiating the request for the resource does not need to manage session tokens and credentials for different proxied resources at different edge systems and may just send the request for the resource to the proxy module. The proxy module may then provide configuration information and authentication information to the gateway proxy module at the edge system to access the proxied resource. The gateway proxy module may authenticate with the resource server and access the requested resource to return to the proxy module to return to the user.

By having the proxy module and gateway proxy module handle all authentication between the user and the proxied resource, described embodiments allow the user or application to submit multiple requests to the proxy module for the resource without passing authentication information related to the resource server.

The term "authentication information" as used herein is defined to mean any type of information presented by a user or application to authenticate the user or application to control access to information and computational and digital resources, including, but not limited to, credential data, tokens, session tokens, access tokens, username/password, security question, keys, IDs, a digital object that proves that the caller provided proper credentials, and any other information to confirm identity or authorization to access digital information and computational resources. Any time a specific type of authentication information is described herein, such as a credential or session token, other types of authentication information may alternatively or additionally be used.

Figure 1:
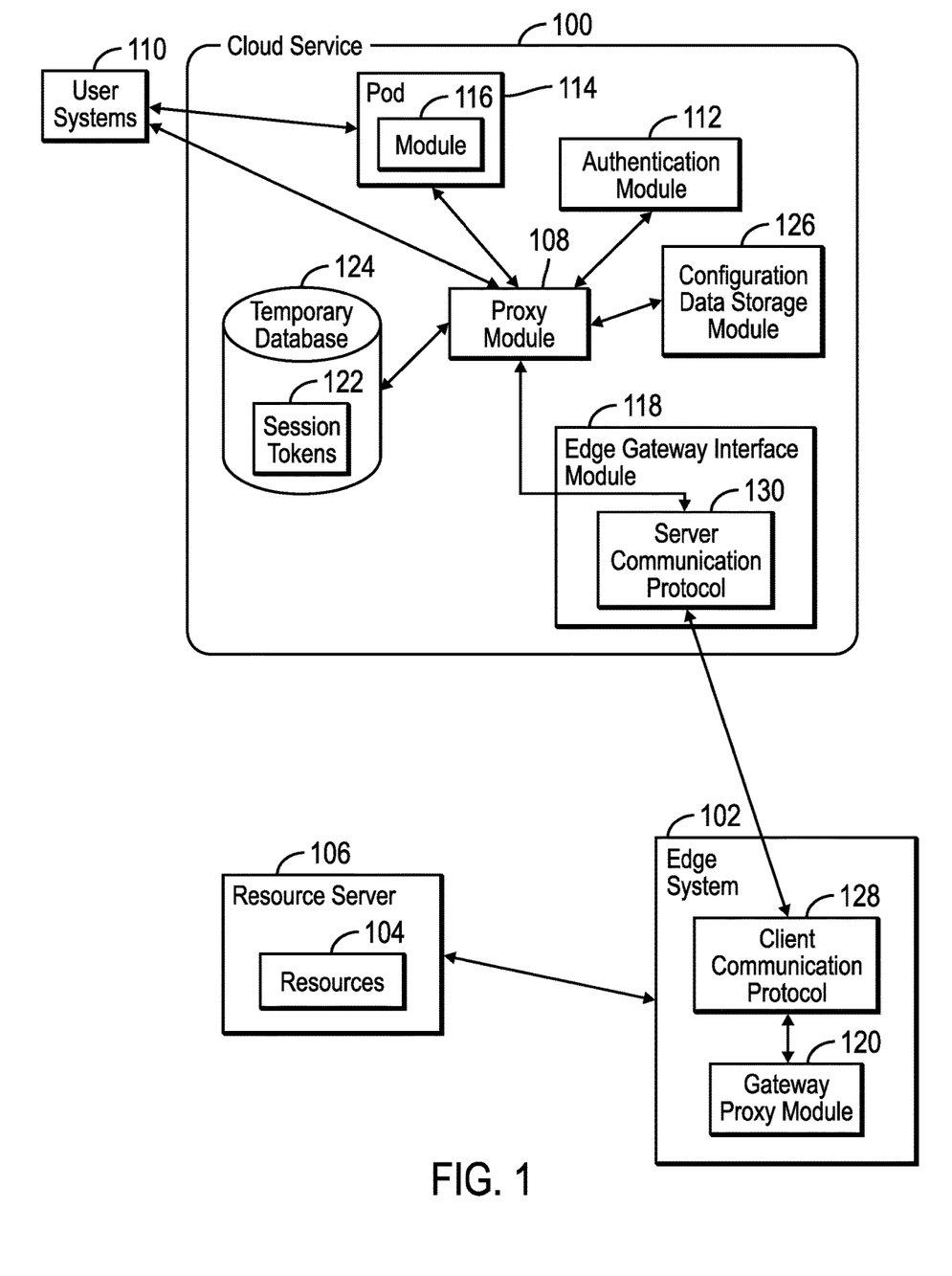
FIG. 1 illustrates an embodiment of a cloud service computing environment to access remote proxied resources.

FIG. 1 illustrates an embodiment of a cloud service 100 that provides a trusted boundary having a proxy module to discover and manage edge systems 102 to use to proxy into proxied resources 104 in a resource server 106. The resources 104 may comprise data resources, computational resources (e.g., virtual machines, virtual servers, artificial intelligence accelerators, streaming resources, etc.), and other digital resources The cloud service 100 includes a proxy module 108 to receive a request for the resources 104, at the remote resource servers 106, from user systems 110 that are authenticated with the cloud service 100 through an authentication module 112 of the cloud service 100. The term "user" as used herein refers to a person or process utilizing the user system 110 to access the cloud service 100. The cloud service 100 may further include computational pods 114 having program modules 116 that may also request resources 104 at the resource server 106 through the proxy module 108.

The cloud service 100 further includes an edge gateway interface module 118 that maintains information on remote edge systems 102 that may be used to access remote resources 104. The proxy module 108 installs a gateway proxy module 120 on the edge systems 102 to configure the edge systems 102 to function as a reverse proxy servers to proxy into the resources 104 on the resource servers 106 using authentication information. The proxy module 108 stores session tokens 122 and/or other authentication information, to access resources 104 in the resource server 106 in a temporary database 124, which may store temporary credentials such as session tokens 122. The proxy module 108 may further retrieve configuration data on the resource server 106, from a configuration data storage module 126, to access the resources servers 106, such as Internet Protocol (IP) addresses, ports to use for access, credentials corresponding to the configuration, and credentials corresponding to the current user, etc.

Once the gateway proxy module 120 is installed on the edge system 102, the gateway proxy module 120 may establish a client communication protocol 128 to connect to a server communication protocol 130 in the edge gateway interface module 118 to provide a secure connection between the proxy module 108 and the gateway proxy module 120. The client communication protocol 128 and server communication protocol 130 may implement a communication protocol, such as WebSocket, Hypertext Transport Protocol (HTTP), polling, etc.

The components 108, 112, 114, 116, 118, 128, 130 of the cloud service 100, the edge systems 102, and the resource servers 106 may be implemented in one or more computer systems, such as enterprise servers. The user systems 110 may comprise servers, personal computers, smartphones, etc.

The program components of FIG. 1, including program components 108, 112, 114, 116, 118, 128, 130, among others, may comprise program code loaded into a memory and executed by one or more processors. Alternatively, some or all functions may be implemented as microcode or firmware in hardware devices, such as in Application Specific Integrated Circuits (ASICs).

The functions described as performed by the program 108, 112, 114, 116, 118, 128, 130, among others, may be implemented as program code in fewer program modules than shown or implemented as program code throughout a greater number of program modules than shown.

The user systems 110, cloud service 100 components, edge system 102, and resource servers 106 may communicate over a network, such as a Storage Area Network (SAN), a Local Area Network (LAN), a Wide Area Network (WAN), Clos network, the Internet, and Intranet, peer-to-peer network, direct communication paths, etc.

Although only one instance of user system 110, edge system 102, and resource server 106 are shown, there may be multiple edge systems 102 registered with the edge gateway interface module 118, and multiple resource servers 106 with multiple resources 104 that may be proxied into through the gateway proxy module 120. In this way, a user system 110 may access resources 104 in different resource servers 106 through different edge systems 102 and gateway proxy modules 120.

In certain implementations, there may be multiple proxy modules 108 to provide improved load balancing of proxy requests and configuration requests to configure gateway proxy modules 120 to access proxied resources 104.

The arrows shown in FIG. 1 between the components and objects represent a data flow between the components.

Figure 2:
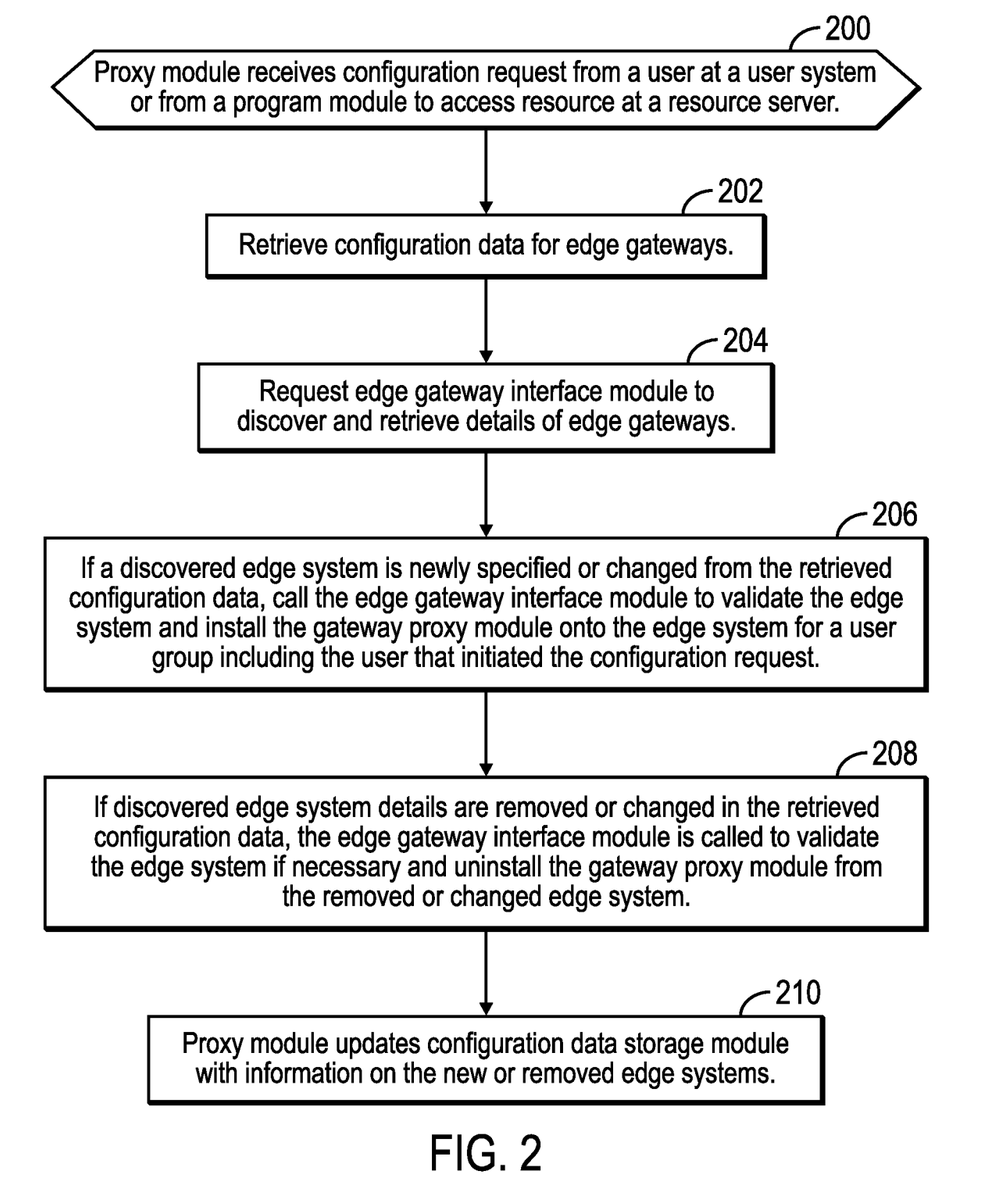
FIGS. 2 and 3 illustrate an embodiment of operations to process a configuration request from a user for a proxied resource at a remote resource server.

FIG. 2 illustrates an embodiment of operations performed by the proxy module 108 to process a configuration request from a user. Upon the proxy module 108 receiving (at block 200) a configuration request, from a user at a user system 110 or from a program module 116, with respect to a resource 104 at the resource server 106, the proxy module 108 retrieves (at block 202) configuration data for registered edge systems 102 from the configuration data storage module 126. The proxy module 108 requests (at block 204) the edge gateway interface module 118 to discover and retrieve details and configuration information on edge systems 102. If (at block 206) a discovered edge system 102 is newly specified or changed from the retrieved configuration data, the proxy module 108 calls the edge gateway interface module 118 to validate the edge system 102 and install the gateway proxy module 120 onto the edge system 102 for a user group including the user that initiated the configuration request. The installation of the gateway proxy module 120 may include authentication information for the user group of the user initiating the configuration request. If (at block 208) the discovered edge system 102 details are removed or changed in the retrieved configuration data, then the proxy module 108 calls the edge gateway interface module 118 to validate the edge system 102 if necessary and uninstall the gateway proxy module 120 from the removed or changed edge system 102. The proxy module 108 updates (at block 210) the configuration data storage module 126 with information on the new, changed or removed edge systems 102.

With the embodiment of FIG. 2, the gateway proxy module 120 on the edge system is configured to provide reverse proxy services for a specified user group that is authenticated through the cloud service 100 authentication module 112. In this way, users may request resources 104 at the resource server 106 without having to provide authentication information to access the resource server 106, as authentication and access are handled seamlessly and transparently by the proxy module 108 and the gateway proxy module 120 to provide a reverse proxy server implementation.

Figure 3:
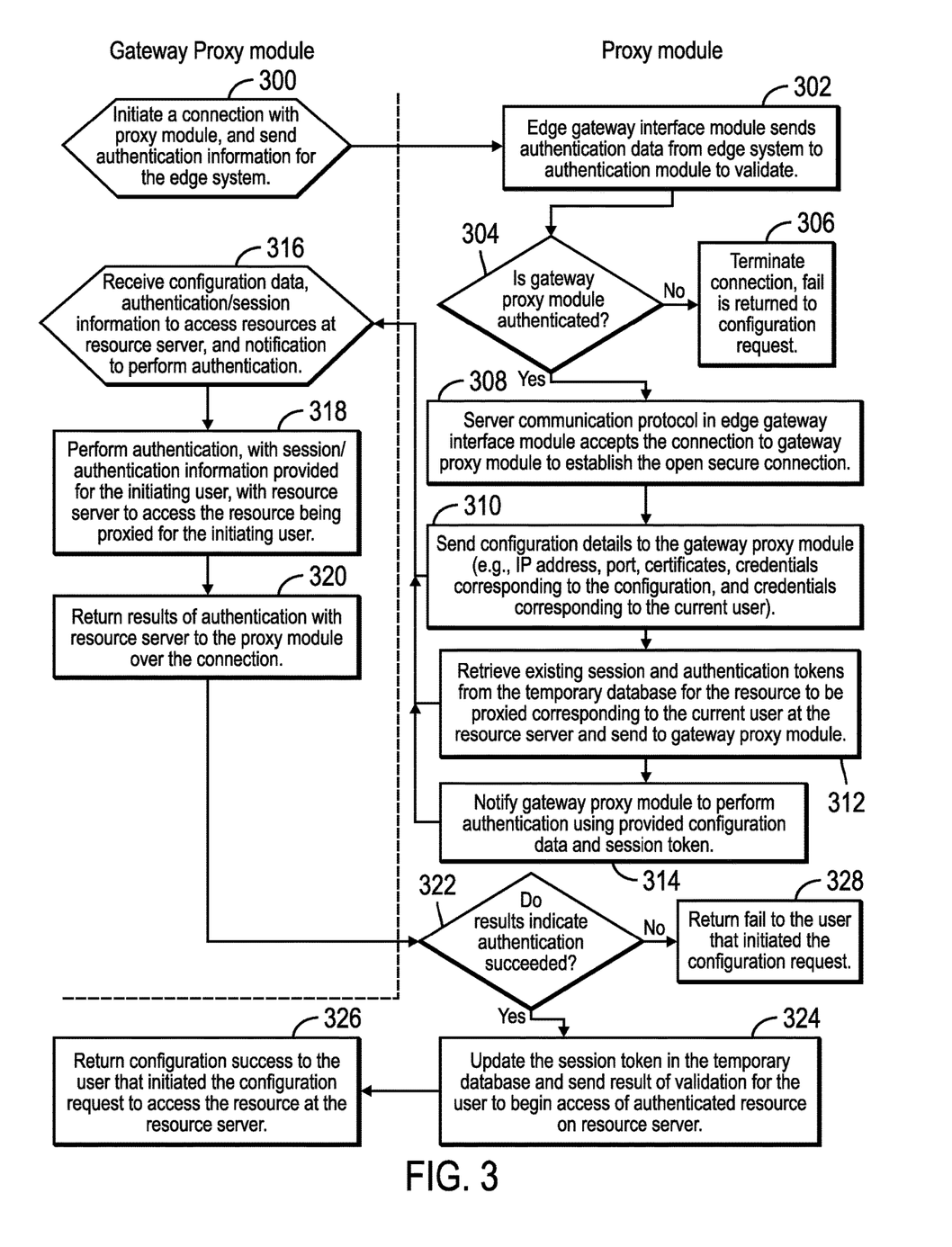

FIG. 3 illustrates an embodiment of operations to continue with the configuration request after the gateway proxy module 120 is installed in the edge system 102 according to the operations of FIG. 2. Upon installation, the gateway proxy module 120 initiates (at block 300) a connection, with a client communication protocol 128, with the proxy module 108, and sends the proxy module 108 authentication information for the edge system 102. The edge gateway interface module 118 sends (at block 302) authentication data from the edge system 102 to the authentication module 112 to validate. If (at block 304) the gateway proxy module 120 is not authenticated/validated, then the connection established at the web client communication protocol 128 is terminated (at block 306) and fail is returned to the configuration request. If (at block 304) the gateway proxy module 120 is authenticated, such as through the authentication module 112, then the server communication protocol 130 in the edge gateway interface module 118 accepts (at block 308) the connection to the gateway proxy module 120 to establish the open secure connection. The proxy module 108 sends (at block 310) configuration details, accessed from the configuration data storage module 126, to the gateway proxy module 120 for accessing the resource server 106 and requested resources 104, such as an IP address, port, certificates, credentials corresponding to the configuration, and credentials corresponding to the current user, etc. If the operation at block 310 fails, such as the proxy module 108 is unable to send the configuration data to the gateway proxy module 120, then the proxy module 108 will indicate in the temporary database 124 that the gateway proxy module 120 account is not synchronized and attempt to resend the configuration data and credentials/session token right before the next proxy request from the user, initiated in FIG. 4. In the event the configuration data and credentials cannot be synchronized between the proxy module 108 and the gateway proxy module 120, then the proxy module 108 may abort the connection and not proceed with future proxy requests from the user for the requested resource. The proxy module 108 retrieves (at block 312) existing session and authentication tokens from the temporary database 124 for the resource 104 to be proxied corresponding to the current user at the resource server 106 and sends to the gateway proxy module 120. In described embodiments, tokens are maintained in the cloud service 100 to provide to multiple proxy edge gateways 120 when needed, to avoid exchanging session tokens when unnecessary.

The proxy module 108 notifies (at block 314) the gateway proxy module 120 to perform authentication using the configuration data and session token session provided for the proxied resource server 106. Upon the gateway proxy module 120 receiving (at block 316) configuration data, authentication/session information to access resources 104 at the resource server 106, and notification to perform authentication, the gateway proxy module 120 initiates (at block 318) authentication, with session/authentication information provided for the initiating user, with the resource server 106. The gateway proxy module 120 returns (at block 320) the results of the authentication with the resource server 106 to the proxy module 108 over the connection. If (at block 322) the proxy module 108 determines that the results from the gateway proxy module 120 indicate the authentication with the resource server 106 succeeded, then the proxy module 108 updates (at block 324) the session tokens 122 in the temporary database 124 to include the session token the gateway proxy module 120 used to successfully authenticate with the resource server 106. The proxy module 108 returns (at block 326) configuration success to the user that initiated the configuration request to access the resource 104 at the resource server 106, which ends the configuration request. If (at block 322) the authentication with the resource server 106 did not succeed, then fail is returned (at block 328) to the user that initiated the configuration request.

With the embodiment of FIG. 3, a proxy module 108 in the cloud service 100 interacts with a gateway proxy module 120 in an edge system 102 in communication with the resource server 106 to have the gateway proxy module 120 establish the connection with the resource server 106. In this way, the user has no knowledge of the session token and credentials needed to access the resource server 106 because the proxy module 108 and gateway proxy module 120 interact to handle authentication to access the resources 104. Further, the gateway proxy module 120 maintains authentication information for a group of users of the cloud service 100 to access the resources 104. Once the gateway proxy module 120 authenticates with the resource server 106, the users in the user group of the user that initiated the configuration request may now access the proxied resources 104 at the resource server 106 without having to manage or present credentials to authenticate with the resource server 106. Further, a user may initiate a configuration request to access resources 104 in different resource servers 106, which would result in the activation of multiple gateway proxy modules 120 at different edge systems 102 to allow seamless access to different proxied resources 104 at different resource servers 106. In this way, edge systems 102 in communication with the proxied resources 104 are used to access the proxied resources 104 to minimize transmission latency for the authentication and accesses of the resource servers 106.

Figure 4:
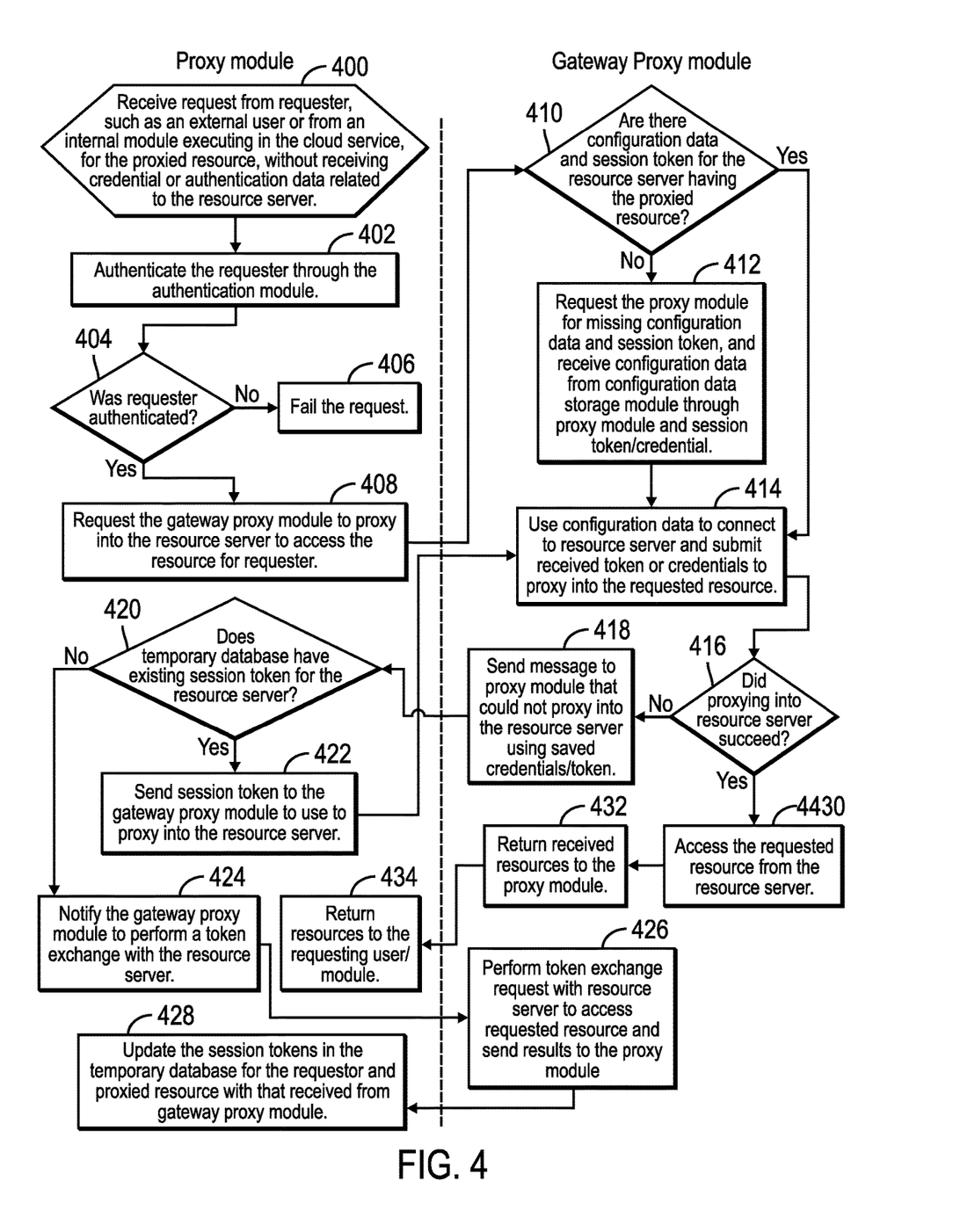
FIG. 4 illustrates an embodiment of operations to process a request for a proxied resource from a user or program module.

With the embodiment of FIG. 3, the gateway proxy module 120 is provided the configuration data, session tokens and other authentication information to store in a local cache for use in processing proxy requests from users in FIG. 4. In certain embodiments, if the connection between the gateway proxy module 120 and the proxy module 108 is interrupted, such as the gateway proxy module 120 restarts or does not receive replies to ping requests from the proxy module 108, then the gateway proxy module 120 may request the proxy module 108 for the configuration data and session token/credential to cache locally and have available for subsequent proxy requests in FIG. 4. In this way, the gateway proxy module 120 is most likely to have the most up-to-date configuration data and credentials available to access the proxied resources 104 immediately upon receiving proxy requests according to FIG. 4.

FIG. 4 illustrates an embodiment of operations at the components of the cloud service 100 and gateway proxy module 120 to provide a user access to the proxied resources 104 without the user initiating the request, a requester, having to present authentication information or credentials. The operations of FIG. 4 may be performed after processing a configuration request, from the user or another user in a group of users including the requester, to establish a gateway proxy module 120 on an edge server system 102 to access a proxied resources 104. The requester may comprise a user at an external user system 110, a module 116 executing independently in the background, or a user interacting with the module 116 in a manner that triggers a request for a proxied resource 104. Upon the proxy module 108 receiving (at block 400) a request for a proxied resource 104 from a requester without receiving a credential or authentication information related to the resource server 106, the proxy module 402 authenticates the requester through the authentication module 112. In certain embodiments, the request from the requester does not include session tokens, credential data or other authentication information so that the user system 110 or requester does not have to maintain or submit credentials and session tokens to access proxied resources available to the requester. The authentication module 112 may determine whether the requester is authenticated to both access the cloud service 100 and, if so, also authorized to access the requested proxied resource 104. If (at block 404) the requester was not authenticated, then the request for the proxied resource 104 is failed.

If (at block 404) the requester was authenticated to access the resource 104 through the cloud service 100, then the proxy module 108 requests (at block 408) the gateway proxy module 120 to proxy into the resource server 106 to access the proxied resource 104 for requester. Upon receiving the request from the proxy module 108, the gateway proxy module 120 determines (at block 410) whether configuration data and a session token, and any other required authentication information, are maintained for the resource server 106 having the proxied resource 104, such as an IP address, port to use, etc. If (at block 410) the gateway proxy module 120 does not already store configuration data and a session token for the resource server 106, then the gateway proxy module 120 sends (at block 412) a request to the proxy module 108 for the missing configuration data and/or session token. Upon receiving (at block 412) the missing configuration data, from the configuration data storage module 126, and/or a session token/credential through the proxy module 108, such as from the temporary database 124 or authentication module 112, or if the gateway proxy module 120 already has the configuration data (from the YES branch of block 410), the gateway proxy module 120 uses (at block 414) the configuration data to connect to the resource server 106 and submits the session token and any other required credentials to the resource server 106 to proxy into the requested resource 104.

If (at block 416) the proxying into the resource server 106 for the requested resource 104 failed, then the gateway proxy module 120 sends (at block 418) a message to the proxy module 108 that it could not proxy into the resource server 106 using saved credentials/token. In response, the proxy module 108 determines (at block 420) whether the temporary database 124 has an existing session token 122, other than the token that failed, for the resource server 106 and resource 104. If (at block 420) there is a session token 122 available, then the proxy module 108 sends (at block 422) the session token to the gateway proxy module 120 to use to proxy into the resource server 106 for the requested resource 104. Control then proceeds back to block 414 for the gateway proxy module 120 to re-attempt to proxy into the resource server 106 using the received session token to access the requested resource 104.

If (at block 420) the temporary database 124 does not have an existing session token for the proxied resource 104, then the proxy module 108 notifies (at block 424) the gateway proxy module 120 to perform a token exchange with the resource server 106 for the requested resource 104. In further embodiments, the exchange may be an exchange for other types of authentication information. In response, the gateway proxy module 120 performs (at block 426) the token exchange request with the resource server 106 for the requested resource 104 and sends the results to the proxy module 108. The proxy module 108 updates (at block 428) the session tokens 122 in the temporary database 124 for the requestor and the proxied resource 104 with the session token received from gateway proxy module 120 as part of the token exchange. In this way, the proxy module 108 uses the gateway proxy module 120 in the edge system 102 that has network access to the resource server 106 to manage the token exchange.

If (at block 416) the gateway proxy module 120 successfully proxied into the resource sever 106, then the requested resource 104 is accessed (at block 430) from the resource server 106 and the received resources 104 are returned (at block 432) to the proxy module 108. The proxy module 108 may then return (at block 434) the requested resources to the requesting user 110/module 120.

With the embodiment of FIG. 4, users 110 or modules 116 may make requests for a resource to a same address in the cloud service, such as the exact same URL, e.g., https://cloudservices/app/qproxy/proxy/abc, without having to pass session tokens and authentication information related to the resource server 106 or send requests to multiple remote resource servers to access different resources. Further, the users 110 and modules 116 do not need to manage different session tokens and credentials to access the different resources at different resource servers. Instead, the user 110 or module 116 may just send a request to the cloud service 100, without having to provide any session or credential information for the resource server 106, and the proxy module 108 and gateway proxy module 120 seamlessly handle the access to the resource servers 106 to obtain the proxied resources for the users 110. In this way, the user does not need to maintain credentials and configuration information for the resource servers 106. Further, with described embodiments, the proxy module 108 can return resources 104 to the users 110 and modules 116 based on their level of access as determined by the authentication module 112, so all the management of access to resource servers 106 and resources 104 is handled by the proxy module 108 and gateway proxy module 120. Further, offloading the direct interaction to gateway proxy modules 120 at edge systems 102 reduces processing burdens in the cloud service 100 by having the connection managed by an edge system 102 that has network access to the resource server 106 to reduce latency in accessing the resource server 106.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
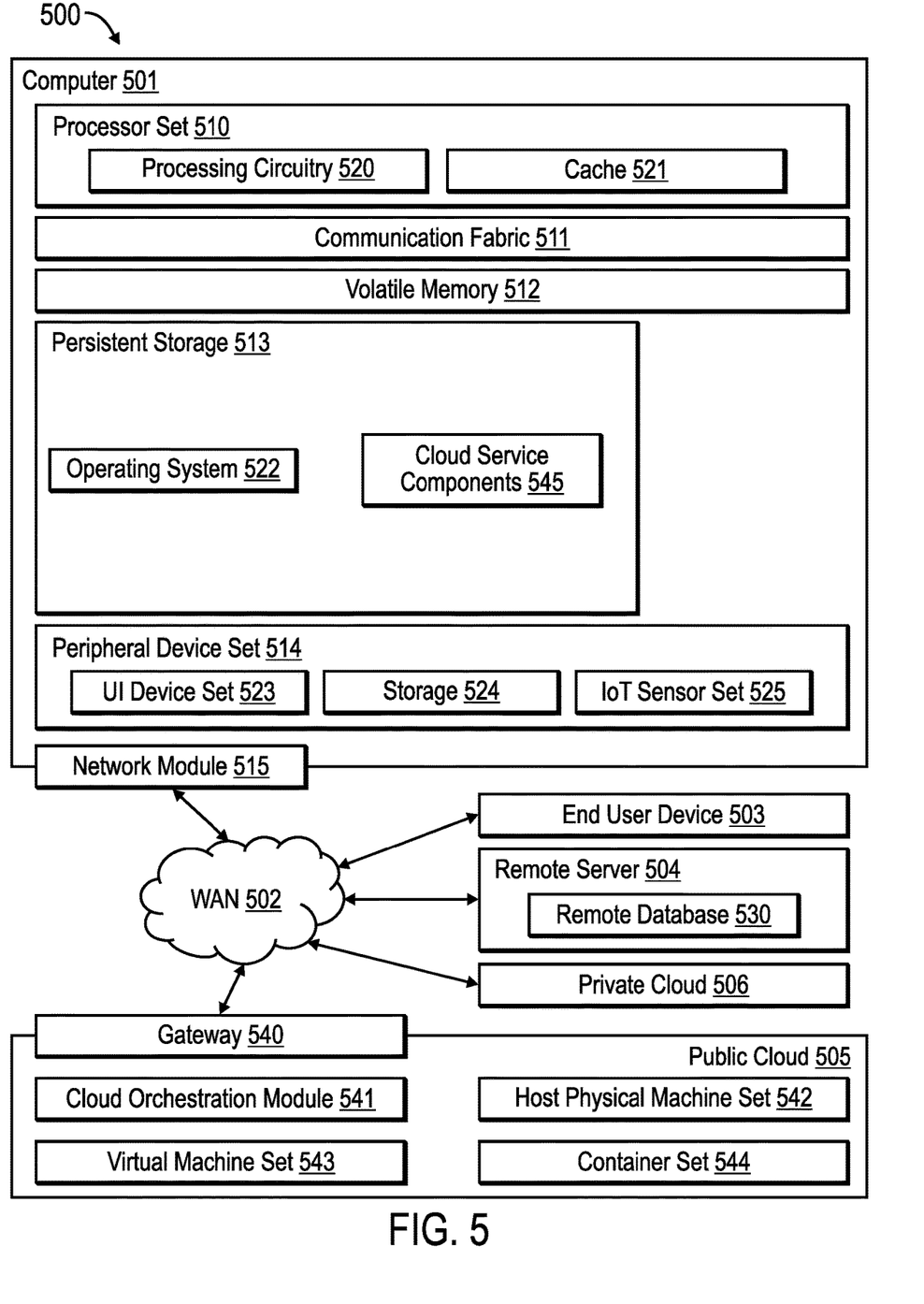
FIG. 5 illustrates a computing environment in which the components of FIG. 1 may be implemented.

With respect to FIG. 5, computing environment 500 contains an example of an environment for the execution of at least some of the computer code involved in performing the inventive methods, including managing access to proxied resources 104 through cloud service components 545 comprising cloud service 100 components including the proxy module 108, the authentication module 112, edge gateway interface module 118, temporary database 124, configuration data storage module 126, server communication protocol 130, proxy module 108 and gateway proxy module 120. In addition to block 545, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and cloud service components 545, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544. The EUD 504 may comprise the user systems 110 that initiate requests to the cloud service 100 for the proxied resources 104 at resource servers 106.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip."

In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in cloud service components 545 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in cloud service components 545 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504. Instances of the remote server 504 may comprise the edge systems 102 and the resource servers 106 in FIG. 1 which the cloud service 100 uses to access the proxied resources 104 at resource servers 106.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud. In the described embodiments, the cloud service 100 may be implemented in the public cloud 505, the private cloud 506 or a hybrid cloud.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for communicating with a resource server to access a resource, the computer program product comprising a computer readable storage medium having computer readable program code embodied therein that when executed performs operations, the operations comprising:

receiving, by a proxy module, a configuration request initiated by a user to access the resource at the resource server;

sending, by the proxy module, to a gateway proxy module on an edge system, configuration data to communicate with the resource server and authentication information to authenticate with the resource server to access the resource;

using, by the gateway proxy module, the configuration data to communicate with the resource server and to send the authentication information to the resource server to authenticate with the resource server;

receiving, by the proxy module, from the gateway proxy module, results of the gateway proxy module authentication with the resource server; and returning, to the user that initiated the configuration request, indication that the configuration request succeeded in response to the gateway proxy module authenticating with the resource server to access the resource.

2. The computer program product of claim 1, wherein the operations further comprise:

detecting, by the gateway proxy module, an interruption in communication with the proxy module;

in response to detecting the interruption, performing:
clearing a local cache, of the gateway proxy module, storing configuration data and authentication information for a resource managed by the gateway proxy module; and
requesting, by the gateway proxy module, configuration data and authentication information for the resource managed by the gateway proxy module.

3. The computer program product of claim 1, wherein the operations further comprise:

in response to failing, by the proxy module, to send, to the gateway proxy module, the configuration data and the authentication information, resending, to the gateway proxy module, the configuration data and the authentication information prior to a next proxy request for the resource.

4. The computer program product of claim 1, wherein in response to receiving the configuration request, further performing:

discovering the edge system to interface with the resource server;

installing, by the proxy module, the gateway proxy module on the discovered edge system; and receiving, by the proxy module, a request to establish a connection with the gateway proxy module in response to the installing of the gateway proxy module on the edge system, wherein the proxy module sends the configuration data and the authentication information to the gateway proxy module in response to establishing the connection with the gateway proxy module.

5. The computer program product of claim 1, wherein the operations further comprise:

retrieving, by the proxy module, the authentication information for an existing session with the resource server from a database, wherein the retrieved authentication information is sent to the gateway proxy module with a request to use the retrieved authentication information to authenticate with the resource server.

6. The computer program product of claim 1, wherein the operations further comprise:

receiving, by the proxy module, from a user system, a request to access the resource at the resource server;

calling an authentication module to authenticate the user system to access the resource at the resource server;

in response to authenticating the request from the user system for the resource, requesting the gateway proxy module to proxy into the resource server to access the resource;

receiving, by the proxy module, the resource from the gateway proxy module; and' returning, by the proxy module, the resource to the user system initiating the request.

7. The computer program product of claim 6, wherein the user system submits multiple requests to the proxy module for the resource without passing authentication information related to the resource server.

8. The computer program product of claim 6, wherein the operations further comprise:

receiving, by the proxy module, a request for configuration data or the authentication information to proxy into the resource server in response to the gateway proxy module not having the configuration data or the authentication information to access the resource at the resource server;

retrieving, by the proxy module, the configuration data to access the resource server and authentication information for the resource at the resource server in a database; and returning, by the proxy module, the retrieved configurating data and the authentication information to the gateway proxy module to use to access the resource at the resource server.

9. The computer program product of claim 8, wherein the operations further comprise:

determining, by the proxy module, whether the authentication information can be retrieved from the database;

sending, by the proxy module, to the gateway proxy module, a request to acquire authentication information from the resource server to access the resource;

receiving, by the proxy module, from the gateway proxy module, the authentication information in response to the request to acquire the authentication information; and updating, by the proxy module, the database with the authentication information obtained in response to the request to acquire the authentication information.

10. The computer program product of claim 1, wherein the operations further comprise:

receiving, by the proxy module, a request, from a program module executing within a computational pod, to access the resource at the resource server;

calling, by the proxy module, an authentication module to authenticate the program module to access the resource at the resource server;

in response to authenticating the program module and the request for the resource, requesting the gateway proxy module to proxy into the resource server to access the resource;

receiving, by the proxy module, the resource from the gateway proxy module; and returning, by the proxy module, the resource to the program module initiating the request.

11. A system for communicating with a resource server to access a resource, comprising:
a processor;
a computer readable storage medium having computer readable program code embodied therein that when executed by the processor performs operations, the operations comprising:
receiving, by a proxy module, a configuration request initiated by a user to access the resource at the resource server;
sending, by the proxy module, to a gateway proxy module on an edge system, configuration data to communicate with the resource server and authentication information to authenticate with the resource server to access the resource;
using, by the gateway proxy module, the configuration data to communicate with the resource server and to send the authentication information to the resource server to authenticate with the resource server;
receiving, by the proxy module, from the gateway proxy module, results of the gateway proxy module authentication with the resource server; and
returning, to the user that initiated the configuration request, indication that the configuration request succeeded in response to the gateway proxy module authenticating with the resource server to access the resource.

12. The system of claim 11, wherein the operations further comprise:
retrieving, by the proxy module, the authentication information for an existing session with the resource server from a database, wherein the retrieved authentication information is sent to the gateway proxy module with a request to use the retrieved authentication information to authenticate with the resource server.

13. The system of claim 11, wherein the operations further comprise:
receiving, by the proxy module, from a user system, a request to access the resource at the resource server;
calling an authentication module to authenticate the user system to access the resource at the resource server;
in response to authenticating the request from the user system for the resource, requesting the gateway proxy module to proxy into the resource server to access the resource;
receiving, by the proxy module, the resource from the gateway proxy module; and'
returning, by the proxy module, the resource to the user system initiating the request.

14. The system of claim 13, wherein the user system submits multiple requests to the proxy module for the resource without passing authentication information related to the resource server.

15. The system of claim 13, wherein the operations further comprise:
receiving, by the proxy module, a request for configuration data or the authentication information to proxy into the resource server in response to the gateway proxy module not having the configuration data or the authentication information to access the resource at the resource server;
retrieving, by the proxy module, the configuration data to access the resource server and authentication information for the resource at the resource server in a database; and
returning, by the proxy module, the retrieved configurating data and the authentication information to the gateway proxy module to use to access the resource at the resource server.

16. A method for communicating with a resource server to access a resource, comprising:
receiving, by a proxy module, a configuration request initiated by a user to access the resource at the resource server;
sending, by the proxy module, to a gateway proxy module on an edge system, configuration data to communicate with the resource server and authentication information to authenticate with the resource server to access the resource;
using, by the gateway proxy module, the configuration data to communicate with the resource server and to send the authentication information to the resource server to authenticate with the resource server;
receiving, by the proxy module, from the gateway proxy module, results of the gateway proxy module authentication with the resource server; and
returning, to the user that initiated the configuration request, indication that the configuration request succeeded in response to the gateway proxy module authenticating with the resource server to access the resource.

17. The method of claim 16, further comprising:
retrieving, by the proxy module, the authentication information for an existing session with the resource server from a database, wherein the retrieved authentication information is sent to the gateway proxy module with a request to use the retrieved authentication information to authenticate with the resource server.

18. The method of claim 16, further comprising:
receiving, by the proxy module, from a user system, a request to access the resource at the resource server;
calling an authentication module to authenticate the user system to access the resource at the resource server;
in response to authenticating the request from the user system for the resource, requesting the gateway proxy module to proxy into the resource server to access the resource;
receiving, by the proxy module, the resource from the gateway proxy module; and'
returning, by the proxy module, the resource to the user system initiating the request.

19. The method of claim 18, wherein the user system submits multiple requests to the proxy module for the resource without passing authentication information related to the resource server.

20. The method of claim 18, further comprising:
receiving, by the proxy module, a request for configuration data or the authentication information to proxy into the resource server in response to the gateway proxy module not having the configuration data or the authentication information to access the resource at the resource server;
retrieving, by the proxy module, the configuration data to access the resource server and authentication information for the resource at the resource server in a database; and
returning, by the proxy module, the retrieved configurating data and the authentication information to the gateway proxy module to use to access the resource at the resource server.

* * * * *